(12) United States Patent
Arfsten et al.

(10) Patent No.: US 9,504,265 B2
(45) Date of Patent: Nov. 29, 2016

(54) FILLING COMPOSITION COMPRISING AN ENCAPSULATED OIL

(75) Inventors: Judith Arfsten, Villars-sur-Glane (CH); Everton De Padua Chicaroni, Santiago (CL); Emmanuel Heinrich, Servion (CH); James William Outram, Pully (CH); Anwesha Sarkar, Lausanne (CH)

(73) Assignee: Nestec S.A., Vevey (CH)

( * ) Notice: Subject to any disclaimer, the term of this patent is extended or adjusted under 35 U.S.C. 154(b) by 19 days.

(21) Appl. No.: 13/997,922

(22) PCT Filed: Dec. 23, 2011

(86) PCT No.: PCT/EP2011/073982
§ 371 (c)(1),
(2), (4) Date: Aug. 1, 2013

(87) PCT Pub. No.: WO2012/089676
PCT Pub. Date: Jul. 5, 2012

(65) Prior Publication Data
US 2014/0154394 A1   Jun. 5, 2014

(30) Foreign Application Priority Data

Dec. 29, 2010   (EP) .................................... 10197244

(51) Int. Cl.
*A23D 9/007* (2006.01)
*A21D 13/00* (2006.01)

(52) U.S. Cl.
CPC ........... *A23D 9/007* (2013.01); *A21D 13/0025* (2013.01); *A21D 13/0035* (2013.01); *A21D 13/0041* (2013.01)

(58) Field of Classification Search
USPC ........................................................ 426/609
See application file for complete search history.

(56) References Cited

U.S. PATENT DOCUMENTS

| | | | |
|---|---|---|---|
| 4,594,255 A | 6/1986 | Wilson et al. | |
| 5,759,599 A | 6/1998 | Wampler et al. | |
| 8,668,946 B2 | 3/2014 | Romoscanu et al. | |
| 2002/0155198 A1 | 10/2002 | Wang et al. | |
| 2010/0136182 A1* | 6/2010 | Rabault et al. | 426/94 |

FOREIGN PATENT DOCUMENTS

| | | |
|---|---|---|
| EP | 0372669 | 6/1990 |
| EP | 1998627 | 12/2008 |
| EP | 2052622 | 4/2009 |
| JP | 02299544 | 12/1990 |
| WO | 9319622 | 10/1993 |
| WO | 9401001 | 1/1994 |
| WO | 2007034213 | 3/2007 |

(Continued)

OTHER PUBLICATIONS

Liu, J.H. "Manual for Baking Industry" China Light Industry Press, May 2003, 10 pages.

(Continued)

*Primary Examiner* — Elizabeth Gwartney
(74) *Attorney, Agent, or Firm* — K&L Gates LLP (57) ABSTRACT

The present invention relates to filling compositions comprising an encapsulated oil, and optionally a free liquid oil. The encapsulated oil comprises at least 40% w/w of a liquid oil encapsulated in a matrix material. The invention also relates to processes for the preparation of the filling composition and its use in composite food products.

14 Claims, 5 Drawing Sheets

(56) References Cited

FOREIGN PATENT DOCUMENTS

| | | |
|---|---|---|
| WO | 2008066380 | 6/2008 |
| WO | 2010057852 | 5/2010 |

OTHER PUBLICATIONS

Chinese Office Action for Application No. 201180063400.1, Dated Jul. 21, 2016, 16 pages.

* cited by examiner

FILLING COMPOSITION COMPRISING AN ENCAPSULATED OIL

CROSS REFERENCE TO RELATED APPLICATIONS

The present application is a National Stage of International Application No. PCT/EP2011/073982, filed on Dec. 23, 2011, which claims priority to European Patent Application No. 10197244.6, filed Dec. 29, 2010, the entire contents of which are being incorporated herein by reference.

FIELD OF THE INVENTION

The present invention relates to lipid based filling compositions (also referred to as creams, or pralines), more particularly to lipid based fillings comprising an encapsulated liquid oil, to the use of encapsulated liquid oils for preparation of filling compositions, as well as to methods for preparing such a filling composition and to the use of the filling composition as a filling in a food product.

BACKGROUND OF THE INVENTION

Lipid based fillings are used in a variety of food products, especially in the field of confectionery and bakery applications. Examples are lipid based fillings, include sweet or savory filings, such as for sandwich biscuits, for wafer products, for crackers or for cakes. However such lipid based fillings tend to have a nutritional profile high in total fat and high in saturated fats due to the solid state of the fat that is necessary in order to provide the desired textural properties.

The type of fat used in those lipid based fillings governs the texture as well as the organoleptic properties of the product. For instance, a fat for a sandwich biscuit filling must provide a sufficiently firm texture to ensure shape stability of the product and to avoid squeezing out the filling upon handling. It should melt in the mouth and it should only have minor fractions of solids that melt above the blood temperature to yield a creamy mouth feel.

The hardness and the melting profile of a fat are linked to its degree of saturation. Highly saturated fats are usually solid at ambient conditions, e.g. palm fat or any hydrogenated vegetable fat. Low levels of saturation yield a liquid product at ambient conditions, e.g. a sunflower oil.

In order to impart the required textural and sensorial properties to lipid-based fillings, high SFA (saturated fatty acids), solid type fats are used for lipid based fillings. Commonly used fats for lipid based fillings are hydrogenated coconut and palm kernel oils. Examples of typical conventional cream fillings include those described, for instance, in U.S. Pat. No. 3,244,536, U.S. Pat. No. 4,834,991, or U.S. Pat. No. 4,753,812, as well as in the chapter entitled 'Sweet and savoury biscuit creams', in D. Manley, Biscuit, cracker and cookie recipes for the food industry, Woodhead Publishing Limited, 2001, p. 137ff.

However, fats containing high amounts of saturated fatty acids (SFA) are known to have negative health benefits and are linked to an enhanced risk for cardiovascular diseases. In the recent years, this has led to an increasingly negative consumer perception of saturates.

Hydrogenation of oil is a commonly used technique to obtain solid type fats from liquid oils. Besides the resulting high SFA content, the presence of trans fatty acids in partially hydrogenated fats has become a severe health issue. Trans fatty acids are associated with cardiovascular diseases as well as with the risk of getting diabetes and some types of cancer such as breast cancer.

Hence it would be desirable to reduce or replace high SFA solid-type fats, or hydrogenated fats containing significant levels of trans fatty acids, by low SFA liquid oils. However, for persons skilled in the art it is evident that in filling compositions it is not possible to use a liquid oil instead of a solid fat. A difficulty in just increasing/replacing the solid fats with low SFA liquid oils is that this impacts on the physical properties such as the taste, texture and the overall appearance of the filling compositions (organoleptic parameters). Also the replacement of solid fats by low SFA liquid oil in the recipe can have a negative impact on processability, such as giving a much softer and stickier filling composition, which can be unprocessable.

US2002/0106426 A1 describes a reduced saturated fat lipid based filling which comprises (a) at least about 20% lipid, wherein said lipid is selected from the group consisting of digestible lipid, non-digestible lipid, and mixtures thereof; and (b) from about 0.5% to about 35% crystallizing lipid. According to US2002/0106426, the fillings described therein can have about 20% less, or even 30% less saturated fat than comparable standard full fat saturated fat lipid based fillings.

US2008/0193621 A1 relates to a cream filler composition which is reported to be free of partially hydrogenated fats and has a saturated fat fraction representing not more than 5% w/w of the total lipid fraction. The composition contains a lipid fraction, a powder sweetener composition, and a wheat gluten fraction having an increased gliadin content.

WO2009/013473 discloses a confectionery composition that is relatively high in polyunsaturated fatty acids. Besides the non-lipid confectionery additives such as sugar cocoa powder, milk powder, yoghurt powder, flavouring, and emulsifier the composition contains a SFA reduced fat blend.

In all of the above the SFA reduction is achieved by a low SFA fat blend containing a crystallizing or structuring agent such as a hydrogenated fat, a highly saturated fat fraction or certain proteins. Furthermore low SFA fat blends tend to compromise the solid texture of a fat and the SFA reduction potential is limited. Moreover, hydrogenated fats have a very negative consumer perception as described above.

The consumer is not willing to compromise on the organoleptic properties of filling compositions, in order to reduce consumption of SFA. Taste, texture and overall appearance are such organoleptic properties.

Obviously, industrial line efficiency is important in the food industry. This includes handling and processing of raw materials, processing of the filling, preparation of composite products comprising the filing, packaging and later storing, in warehouses, on the shelf or at home.

Accordingly there is an ongoing need to provide low SFA lipid based filing compositions, having good organoleptic properties.

It is an object of the present invention to provide lipid based filling compositions that have a low SFA content.

It would be advantageous to provide lipid based filing compositions that are low in SFA, and that may be easily industrialised at a reasonable cost without compromising the organoleptic parameters.

SUMMARY OF THE INVENTION

The inventors have developed a substantially different route to obtain a low SFA lipid based filling. In contrast to approaches of the prior art, the present invention does neither rely on blending different fats or fat fractions nor on crystallizing liquid oils.

It has surprisingly been found by the inventors that encapsulated liquid oils can be used to replace partially or completely the solid fats conventionally used in a lipid based confectionery filling, without compromising the texture and organoleptic properties of the filling.

Accordingly, in one aspect there is provided a filling composition comprising an encapsulated liquid oil, preferably in combination with a free liquid oil. In a preferred aspect the encapsulated liquid oil is an oil powder comprising an inner core comprising a liquid oil encapsulated in a matrix material comprising proteins, carbohydrates, or other surface active agents, or mixtures thereof.

In a preferred embodiment the encapsulated liquid oil is an oil powder comprising at least 60% w/w of a liquid oil in an inner core, encapsulated in an outer shell comprising cross-linked protein.

Advantageously the present invention makes it possible to provide lipid based fillings which are low in SFA, whilst maintaining the good organoleptic properties of a corresponding solid fat filling.

Advantageously filling compositions of the invention have good temperature sensitivity properties.

In other aspects there are provided the use of an oil powder for the preparation of a filling composition, the use of the filling composition in a composite product, composite products containing the filing composition.

There is also provided a process for preparing a filling composition according to the present invention, comprising mixing an encapsulated liquid oil comprising at least 40% w/w of a liquid oil and an encapsulating matrix material, and optionally a free liquid oil, with the remaining ingredients of the filling composition. In a preferred aspect the encapsulated liquid oil is an oil powder comprising at least 60% w/w of a liquid oil as an inner core and a encapsulated in an outer shell of a matrix material comprising protein.

DETAILED DESCRIPTION OF THE INVENTION

The inventors of the present invention have surprisingly found that lipid based filling compositions with good organoleptic properties can be prepared by partial or total replacement of solid fats with an encapsulated liquid oil, preferably in combination with a liquid oil, without compromising the texture and organoleptic properties of the filling.

The filling compositions of the invention have a firm texture, and a creamy and pleasant mouth feel. The present invention makes it possible to provide sweet and savoury lipid based fillings, which are low in SFA, whilst having good organoleptic parameters.

The fillings of the present invention advantageously have similar or same textural properties to a corresponding solid fats based filling composition.

Advantageously the fillings of the present invention can provide similar or the same density as a corresponding solid fats based filling composition.

Advantageously the fillings of the present invention can provide similar sensorial properties as a corresponding solid fats based filling composition. The fillings of the invention have the desired creamy and pleasant mouthfeel due to the release of encapsulated oil in the mouth.

A further important advantage of the filling compositions of the invention is their good temperature sensitivity properties, due to the heat stability of the encapsulated oil. For instance the changes in textural properties of the filling upon cooling and heating are much smaller than for a corresponding solid fat filling composition.

The filling compositions are also easy to prepare due to use of powder and liquid ingredients.

In the present context the term "filling composition" relates to a pre-prepared composition to be used as one part of a composite product. The filling and the other part(s) of the composite product are composed of different components. Preferably, the filling is surrounded by the other part(s) of the composite product.

In the present context the term "free liquid oil" refers to a liquid oil that is not part of the oil powder, i.e. which is in liquid form at ambient conditions.

The encapsulated liquid oil (otherwise referred to herein as "encapsulated oil") comprises a matrix material encapsulating a liquid oil. Any type of encapsulated oil that is solid at room temperature is contemplated.

Preferably the encapsulated oil is an oil powder. The oil powder comprises an inner core comprising a liquid oil and an outer shell comprising a cross-linked emulsifier. Preferably the outer shell comprises a protein matrix or a protein-carbohydrate matrix.

A powder is a bulk, granular solid composed of a large number of fine particles that may flow freely when shaken or tilted.

Any type of known oil powder that is solid at room temperature is suitable to be used according to the present invention given that the oil content is high enough to provide the desired creamy and pleasant mouthfeel. The liquid oil content of the oil powder is at least 40% w/w, such as from 40 to 99.5% w/w. Preferably the oil powder comprises at least 60% w/w, preferably at least 65% w/w, more preferably at least 70% w/w, more preferably at least 80% w/w, more preferably at least 90% w/w oil, such as at least 95% w/w, or even at least 99% w/w oil. For instance, in some embodiments the oil powder contains from 60% to 99.5% w/w oil, in one preferred embodiment the oil powder contains from 70% to 99.5% w/w oil. In a preferred embodiment the oil powder comprises from 90% to 99.5% w/w, such as from 90% to 99% w/w oil. Above 99.5% w/w oil content the oil powder can start to lose its solid state properties.

The encapsulated oil can be obtained by known emulsion-based encapsulation processes. These processes have in common that they are based on an oil-in-water emulsion that is dried to obtain an oil powder. The drying step can be carried out by any commonly known drying technique such as air drying, ventilation, spray drying, vacuum drying, freeze drying, etc. Prior to the drying step a step to crosslink the emulsifier can be included. Suitably this may be effected by a heat treatment, a chemical treatment or an enzymatic treatment to crosslink the used emulsifier, e.g. milk proteins. The final encapsulated oil usually consists of a liquid vegetable oil that is encapsulated in a matrix material consisting of proteins, carbohydrates, or other surface active agents, or mixtures thereof.

The oil used for preparing the emulsion can be any vegetable oil or fat that is liquid or that can be liquefied at ambient conditions. The oil is suitably a food grade oil. Examples include sunflower oil, rapeseed oil, olive oil, soy oil, fish oil, linseed oil, safflower oil, corn oil, algae oil, cottonseed oil, palm oil, palm kernel oil, coconut oil, grape seed oil, a nut oil such as hazelnut oil, walnut oil, or other nut oil, peanut oil, rice bran oil, sesame oil, or combinations thereof. Optionally, the oil can contain one or more liposoluble compounds; such as for example plant polyphenols, fatty acids, such as n-3 fatty acids, n-6 fatty acids, vitamins, aromas, flavours, antioxidants, other active ingredients. Preferred antioxidants include ascorbic acid, ascorbyl palmitate, citric acid, rosmarin extract, BHA, BHT, mixed tocopherol, and EDTA.

Preferably, a vegetable oil is used, more preferably an oil with a low SFA content is chosen such as high oleic sunflower oil or high oleic rapeseed oil.

The matrix material may comprise a protein; a carbohydrate, such as sugars, for instance lactose, glucose, maltodextrin, a starch, cellulose; other surface active agent/emulsifier, or mixtures thereof. Preferably the matrix material used is a protein-based emulsifier. The protein that is used to encapsulate the oil can be any food-grade protein such as milk and/or whey proteins, soy proteins, pea proteins, caseinate, egg albumen, lyzozyme, gluten, rice protein, corn protein, potato protein, pea protein, skimmed milk proteins or any kind of globular and random coil proteins as well as combinations thereof. In one preferred embodiment the protein is one or more milk and/or whey derived protein.

Preferred milk proteins or milk protein fractions in accordance with the present invention comprise, for example, whey proteins, α-lactalbumin, β-lactalbumin, bovine serum albumin, acid casein, caseinates, α-casein, β-casein.

As far as whey proteins are concerned, the protein source may be based on acid whey or sweet whey or mixtures thereof and may include α-lactalbumin and β-lactalbumin in any proportions. The proteins may be intact or at least partially hydrolysed.

Typically the encapsulated oil comprises up to about 30% w/w of the encapsulating protein, preferably up to about 20% w/w protein, more preferably up to about 10% w/w protein, more preferably up to about 5% w/w protein. In one preferred embodiment an oil powder according to the invention comprises a maximum of 5% w/w of the protein. In another preferred embodiment an oil powder according to the invention comprises a maximum of 3% w/w of the protein.

In a further preferred embodiment an oil powder according to the invention comprises a maximum of 1% w/w of the protein.

The single encapsulated oil capsules of oil powder according to the invention typically have an average diameter in the range of form about 0.1 to 100 μm, for example about 1 to 50 μm.

To increase the flowability of the oil powder free flow agents or anti-cake agents may be added to the oil powder. Examples of suitable anti-caking agents include tricalcium phosphate, sodium bicarbonate, sodium silicate, silicon dioxide, calcium silicate, magnesium trisilicate, talcum powder, aluminium silicate, stearic acid, polydimethylsiloxane, starch, sugars, and maltodextrins, or their mixtures.

The proteins may optionally comprise food grade salts, such as sodium citrate, magnesium citrate, potassium citrate or combinations thereof. Such salts may be present in an amount typically up to 10% w/w, preferably from 0 to 5% w/w.

Emulsion based processes to obtain oil powders are known and suitable oil powders are commercially available. Suitable such oil powders can be prepared according to known processes, for instance, such as described in EP 1 998 627, WO2010/057852, WO2008/066380.

According to one embodiment the oil powder may be prepared by an emulsion based process, comprising preparing an emulsion of the oil, the emulsifier (preferably a protein), and optionally a food grade salt and/or a liposoluble compound; crosslinking the protein, for example by heating, UV-radiation, high pressure treatment, chemically or enzymatically; spray-drying the emulsion to generate the oil powder. According to one embodiment an oil powder as described in WO2010/057852 is used.

The filling composition according to the invention may typically comprise about 5% to 70% w/w, preferably from about 5 to 60% w/w, preferably from about 5 to 50% w/w, such as from about 10 to 50% w/w, of the oil powder.

The used encapsulated oil confers a solid texture to the filling. Upon mechanical stress in the mouth and upon contact with the saliva the oil powder releases its oil in the mouth, hereby imitating a melting event.

Advantageously the filing composition comprises an amount of a free liquid oil. The free liquid oil can be any oil that is liquid. The oil can comprise any food grade mineral oils and/or organic oils (oils produced by plants or animals). Examples include sunflower oil, rapeseed oil, olive oil, soy oil, fish oil, linseed oil, safflower oil, corn oil, algae oil, cottonseed oil, palm oil, palm kernel oil, coconut oil, or combinations thereof. Preferably the free liquid oil is a liquid vegetable oil, such as sunflower oil, rapeseed oil, olive oil, soy oil, fish oil, linseed oil, safflower oil, corn oil, algae oil. Preferably, an oil with a low SFA content is chosen such as high oleic sunflower oil or high oleic rapeseed oil. Optionally, the liquid oil can contain one or more liposoluble compounds; such as for example plant polyphenols, fatty acids, such as n-3 fatty acids, n-6 fatty acids, vitamins, aromas, flavors, antioxidants, other active ingredients.

The addition of free liquid oil ensures a good lubrication of an oil powder. Without addition of the liquid oil, replacement of solid fat in a filing composition by oil powders can yield a powdery product instead of a continuous filling.

The textural properties of the filling depend, amongst others, on the ratio of encapsulated oil to the liquid oil, the oil content of the encapsulated oil, the particular type of encapsulated oil—e.g. oil powder, the lipid content of the filing and the mixing conditions used for preparation of the filing from the ingredients. If mixing conditions are chosen that induce a release of liquid oil from an oil powder, the addition of liquid oil can in some cases be avoided. However, adjusting filling texture to obtain the desired filing texture is difficult by this means.

The texture of the filling can easily be adjusted by adjusting the ratio of free liquid oil to encapsulated oil. For instance, an increase in liquid oil yields more fluid fillings, whereas an increase of oil powder yields firmer fillings. Anyway, a certain amount of liquid oil is preferred to obtain a continuous filling instead of a particulate mass. The exact amount of liquid oil to be used depends on the type of used oil, on the type of used oil powder, and on the mixing procedure. Regarding the type of oil powder, the amount of free liquid oil required to arrive at a certain desired texture will vary dependent on the ratio of encapsulated oil to encapsulating matrix material in the oil powder. Stronger mixing conditions (longer mixing times, higher shear forces) lead to a partial release of encapsulated oil, e.g. from an oil powder. In this case, less free liquid oil is required to achieve a certain texture.

As an indication a lipid based filling composition may contain from 0 to 30% w/w, such as from 0.1 to 30% w/w, such as from 1 to 30% w/w, such as from 1 to 20% w/w, such as from 1 to 15% w/w of free liquid oil.

As an indication, possible ratios of oil powder to free liquid oil (where present) can be from about 0.5:1-20:1, preferably from about 1:1-10:1, more preferably about 1.5:1-8:1.

In a further embodiment the filling composition has a fat content in the range of 5 to 70% (w/w), such as 15-60% (w/w), such as 15 to 55% (w/w), such as 20-60% (w/w), such as 20-50% (w/w), such as 20-40% (w/w), such as 30-40% (w/w), or such as 25-35% (w/w) by weight of the filling composition. The amount of fat may vary depending on the type of product.

In the preparation of the filling compositions of the present invention oil powders, preferably in combination with a free liquid oil, are used partially or totally in place of the usual solid fats. Typical solid fat replacement ratios are from about 1% to 100%, preferably from about 15% to 100%, preferably from about 15% to 100%, more preferably about 15-75%, more preferably about 25-60%. Preferred replacement rations depend amongst others on the desired texture and other organoleptic properties of the filling composition. Higher replacement ratios can in some cases lead to products with a more grainy texture. At very high, near 100%, replacement ratios there can, in some cases be some leakage of the oil from the oil powder, which can be less desirable for certain applications.

One beneficial feature of the present invention is the flexibility of the approach in terms of ingredients. The present invention is not related to particular fat fractions or crystallizing agents. In the present invention any type of oil with a desired degree of saturation can be used. In doing so, a significant reduction in SFA content compared to a lipid based filling based on conventional solid fats can be obtained, such as much as 30-40% reduction, even a 50% reduction or higher. For instance, fat-based fillings with an SFA content as low as that of a high oleic sunflower oil (about 8% w/w SFA) can be obtained.

The filling composition, or cream, of the present invention may be aerated or unaerated. The filing composition, or cream, of the invention may be sweet, e.g. a confectionery filling for use in a composite product such as a sandwich, a biscuit, a wafer, or other composite confectionery product. The filling composition, or cream, according to the invention may alternatively be savory, such as a filling for a bakery product or a sandwich cracker, or a lipid based topping, e.g. for use on top of a composite product, or a spread.

Depending on the specific type of filling composition, different types of ingredients may be supplemented to the filling composition.

For instance typical savory filling compositions may further comprise supplementary ingredients such as solid fats, salt, maltodextrin, skimmed milk powder, full cream milk powder (FCMP), whey powder, cheese powder, natural or synthetic flavors, natural or artificial colors, starch based fillers, emulsifiers such as lecithin, and other ingredients.

Generally the major ingredient in a savory filling is fat. Typical total fat content of a savory filling is about 5-70% (w/w), preferably 15-55 (w/w), more preferably 20-50 (w/w). In some embodiments the filling composition may have a salt content in the range 0-2% by weight of the filling composition. In a more specific embodiment the salt is sodium chloride.

For instance typical sweet filling compositions may further comprise supplementary ingredients such as solid fats, sugar, fat, skimmed milk powder, full cream milk powder, whey powder, fruit acids, cocoa powder, natural or synthetic flavors, natural or artificial colors, starch based fillers, emulsifiers such as lecithin, and other ingredients. The sugar is typically one or more of sucrose, dextrose, maltodextrin and/or lactose, preferably sucrose. Generally the major ingredients of a sweet filling are sugar and fat. Typical total fat content of a sweet filling is about 5-70% (w/w), preferably 15-55 (w/w), more preferably 20-50 (w/w).

Typical solid fats include coconut oil, palm kernel oil, palm oil, cocoa butter, butter oil, lard, tallow, oil/fat fractions such as lauric or stearic fractions, hydrogenated oils, and blends thereof.

In a particular embodiment the filling composition comprises from 5-70% w/w of an encapsulated liquid oil, from 0-65% w/w of a solid fat and from 0-30% w/w of free liquid oil. In a preferred embodiment the filling composition may comprise from 5-60% w/w of an encapsulated liquid oil, from 5-50% w/w of a solid fat and from 1-20% w/w of a free liquid oil.

In some embodiments the sweet filling comprises an amount of sugar of about 10 to 70% w/w, preferably from about 20 to 70% w/w, such as from about 35 to 65% w/w, such as from about 45 to 55% w/w sugar.

In some embodiments the sweet filling contains cocoa powder in an amount from 1 to 80% w/w, preferably from about 5 to 70% w/w, such as from about 5 to 50% w/w, from about 5 to 40% w/w, from about 10 to 30% w/w, for instance around 10 to 20% w/w cocoa powder.

In a particular embodiment the filling composition comprises from 10 to 70% w/w of sugar, and from 5 to 70% of cocoa powder.

According to one aspect of the present invention a process is provided for preparing a filling composition, said process comprises mixing an encapsulated liquid oil comprising at least 40% w/w of a liquid oil and an encapsulating matrix material, and optionally a free liquid oil, with the remaining ingredients of the filling composition. In a preferred aspect the encapsulated liquid oil is an oil powder comprising at least 40% w/w of a liquid oil as an inner core and a cross-linked emulsifier forming an outer shell.

The mixing of the ingredients can be carried out by conventional mixing, refining, and/or aeration methods, for instance using standard industrial mixing apparatus.

It should be noted that embodiments and features described in the context of one of the aspects or embodiments of the present invention also apply to the other aspects of the invention.

According to another aspect there is provided a composite product comprising the filling composition according to the invention. The composite product may be, for instance, a sandwich, biscuit, cracker, wafer, or bakery product comprising the filling composition of the invention as a filling or as a topping.

All patent and non-patent references cited in the present application, are hereby incorporated by reference in their entirety.

The invention will now be described in further details in the following non-limiting examples.

EXAMPLES

Example 1

Preparation of an Oil Powder

An oil powder was prepared according to WO2010/057852.

(i) Emulsion Preparation:

Sunflower oil was emulsified in an aqueous solution of WPI (whey protein isolate, 1% (w/w)). The final emulsion contained 20% (w/w) of sunflower oil. The emulsification was carried out with a high pressure homogenizer. The parameters were adapted to reach an oil droplet size between 0.5 microns and 5 microns.

(ii) Thermal Crosslinking:

The emulsion was heat treated at 80° C. for 10 min to achieve a cross-linking of the protein layer which surrounds the oil droplets in the emulsion. The crosslinked emulsion was subsequently cooled to ambient temperature.

(iii) Spray Drying Process:

The emulsion was spray dried in a Niro SD-6.3-N pilot plant spray dryer. The following parameters were used: atomization by a spraying disc, throughput 101/h, inlet temperature 105° C., outlet temperature 65° C. The obtained oil powders had a moisture content of less than 0.5% (w/w).

Example 2

Composition of Oil Powders

Two types of oil powders were used for the preparation of the fillings (the oil powder produced according to example 1 and oil powder Vana-Grasa 80B 198). In Table 1 the composition of both oil powders is given. The oil powder Vana-Grasa 80B 198 is a commercially obtainable spray-dried oil powder.

TABLE 1

Composition of the oil powders (in % w/w)

| Vana-Grasa 80B 198 olive oil powder by Friesland kievit | % w/w | Oil powder of Example 1 | % w/w |
|---|---|---|---|
| Extra virgin olive oil | 80% | High oleic sunflower oil | 95.3% |
| Glucose syrup | 15% | Whey proteins | 3.5% |
| Caseinate | 2½% | Moisture | <0.5% |
| Pentasodium triphosphate (E451i) | 1½% | | |
| Silicon dioxide (E551) | ½% | | |
| Natural flavor | <½% | | |
| Moisture | 1% | | |

Example 3

Preparation of Sample Filings

A number of filings were prepared according to the recipe examples below:

(i) Recipe of a Savory Cheese Cream (Amounts in % w/w)

| Solid Fat | 25% |
| Oil Powder (Eg. 1) | 8% |
| Soy oil | 4% |
| Whey powder | 10% |
| Cheese powder | 37% |
| Starch | 7% |
| Rework | 7% |
| Salt | 0.5% |
| Flavor | 1.4% |
| Color | 0.1% |

(ii) Recipe of a Low Fat Milk Cream (Amounts in % w/w)

| Solid Fat | 10% |
| Oil Powder (Eg. 1) | 7% |
| rapeseed oil | 3% |
| Lecithin | 0.5% |
| Sugar | 58% |
| Whey powder | 15% |
| Rework | 6% |
| Flavor | 0.25% |
| Color | 0.25% |

(iii) Recipe of a High Fat Milk Cream (Amounts in % w/w)

| Solid Fat | 20% |
| Oil Powder (Eg. 1) | 25% |
| sunflower oil | 5% |
| Lecithin | 0.5% |
| Sugar | 45% |
| FCMP | 3.5% |
| Salt | 0.4% |
| Flavor | 0.3% |
| Color | 0.3% |

For the preparation of the filling all filling ingredients were added to the bowl of a standard kitchen aid. Alternatively, the dry ingredients were first blended and the solid fat is added in a molten state. The ingredients are mixed until a continuous filling mass is obtained. Alternatively, after mixing the filling mass was refined and then blended with the residual fat and liquid oil or aerated after refining (in case of aerated filling).

The fillings obtained were all observed to have similar textural properties to corresponding solid fat fillings (i.e. in which the fat ingredient content is made up only of solid fat)

Example 4

Preparation of Sample Confectionery Fillings

A number of filings were prepared according to table 2 below. In the recipe examples shown in Table 2 the degree of solid fat replacement, the ratio of oil powder to liquid oil, the type of oil powder as well as the mixing intensity was varied.

For the preparation of the filling all filling ingredients were added to the bowl of a standard kitchen aid. Alternatively, the dry ingredients were first blended and the solid fat is added in a molten state. The ingredients are mixed until a continuous filling mass is obtained.

TABLE 2

Composition variations of a chocolate filling

| Composition | 1 | 2 | 3 | 4 | 5 | 6 | 7 | 8 |
|---|---|---|---|---|---|---|---|---|
| Solid vegetable fat | 30 | 15 | 15 | 15 | 7.5 | — | — | — |
| Sugar | 50 | 50 | 50 | 50 | 50 | 50 | 50 | 50 |
| Skimmed milk powder | 4.5 | 4.5 | 4.5 | 4.5 | 4.5 | 4.5 | 4.5 | 4.5 |
| Lecithin | 0.5 | 0.5 | 0.5 | 0.5 | 0.5 | 0.5 | 0.5 | 0.5 |
| Cacao powder | 15 | 15 | 15 | 15 | 15 | 15 | 15 | 15 |
| Oil powder | — | 9 | 13 | 7.5K | 16.5 | 20 | 20 | — |
| Sunflower oil | — | 6 | 2 | 7.5 | 6 | 10 | 10 | 30 |
| Comments | Positive Reference | | | | | | Higher mixing shear | Negative Reference |

The Vana-Grasa oil powder by kievit is indicated by the letter K. All other recipes use the oil powder prepared according to Example 1 above.

In the following examples functionalities such as the oil leakage behavior, and the density of the filling compositions of Table 2 were determined. Filling compositions according to the invention were compared with a reference filling (prepared with a solid fat) and with a filling prepared with liquid oil (no oil powder).

Example 5

Oil Release from Sample Confectionery Fillings

Oil release, or oil leakage, is an important technological feature of a filling. An increased oil release from the filling leads to a diffusion of oil into the surrounding food matrix, e.g. a biscuit for a sandwich biscuit. Free oil, released from the continuous filling mass, is also detrimental for a proper mouthfeel. Moreover, the amount of released oil over time governs the storage stability of the filling.

Figure 1:
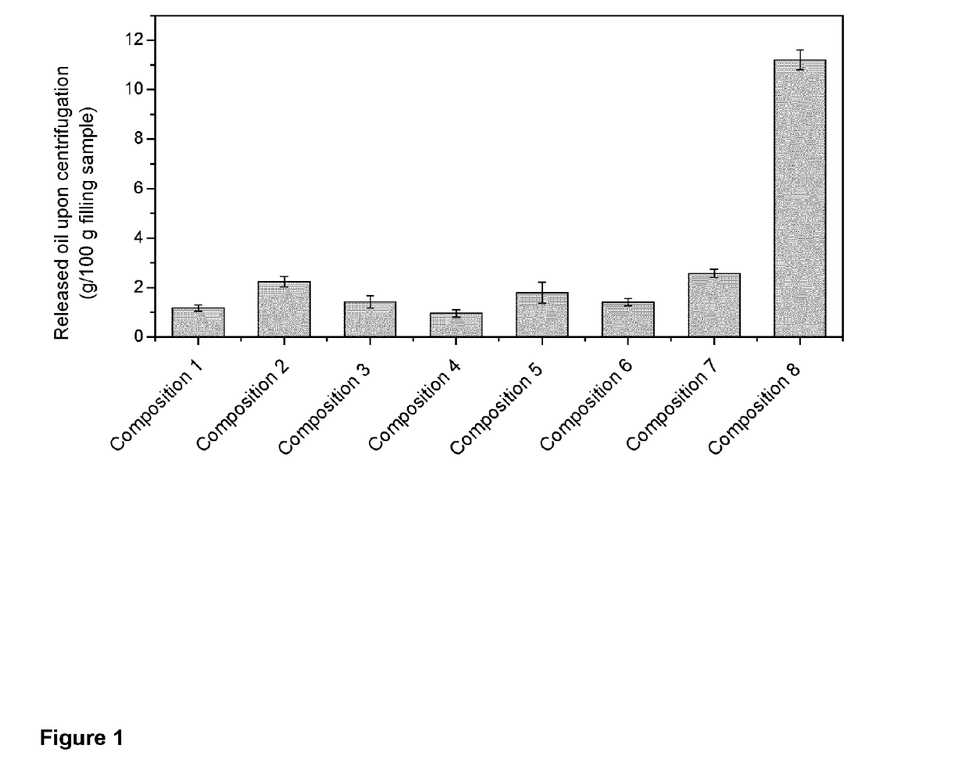
FIG. 1 shows a graphical representation of the amount of released oil from filling compositions according to the invention and comparative reference filling compositions.

The tendency for oil release was measured by a centrifugation test. A defined amount of filling is centrifuged. After the centrifugation separated oil on top of the filling is carefully removed by a filter paper. The amount of released oil is gravimetrically determined. FIG. 1 shows the obtained quantities of released oil for the investigated filling samples. For the detailed composition of the different fillings samples it is referred to Table 2.

It is evident from FIG. 1 that a filling cannot be prepared with a liquid oil alone (composition 8) due to the immense tendency for oil release. Moreover, the results indicate that oiling out is a function of the ratio of oil powder to liquid oil, the oil content of the solid oil powder, and the applied shear forces. These parameters can be used to adjust the oiling out behavior.

Example 6

Density of Sample Confectionery Fillings

Another important characteristic of a filling is its bulk density. The bulk density affects the mouth feel of the filling. Moreover, if the filling density is increased more filling mass might be required for a given product to account for certain consumer expectations. This might lead to undesired cost and nutritional implications.

Figure 2:
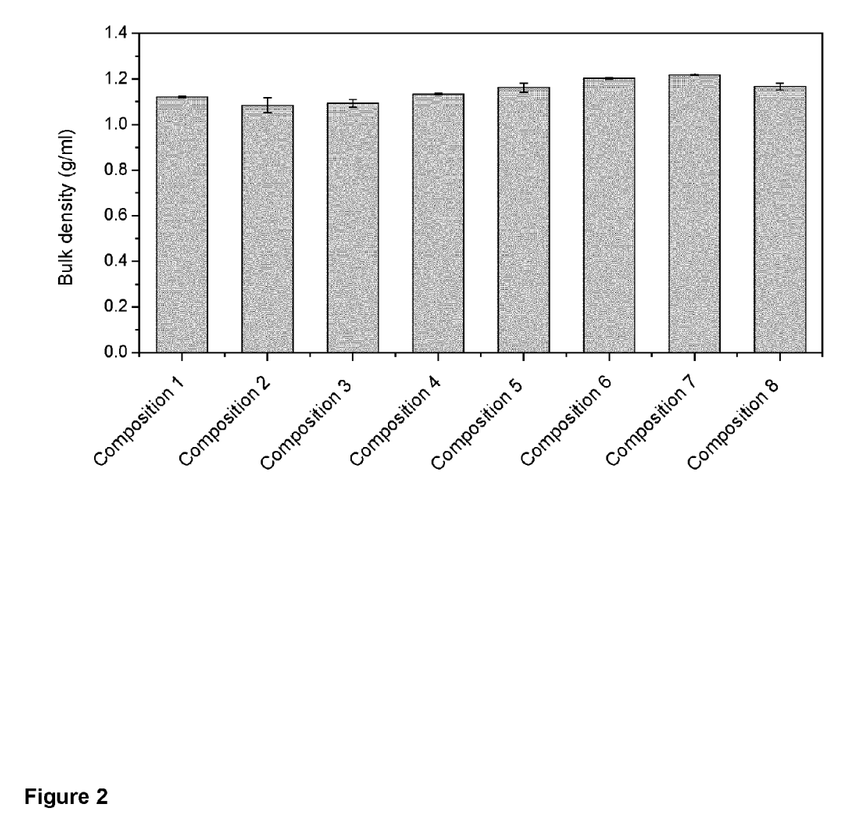
FIG. 2 shows a graphical representation of the bulk densities of filling compositions according to the invention and comparative reference filling compositions.

The bulk densities of different filling samples were determined gravimetrically. FIG. 2 depicts the results for a reference filling as well as for different oil powder fillings. For the detailed composition of the different fillings samples it is referred to Table 2. The results reveal that similar densities can be obtained when replacing solid fat by oil powder.

Example 7

Relative Hardness (Measured as Peak Compressive Force) of Sample Confectionery Fillings An important technological feature of a filling is its relative hardness as compared to the reference filling, which contributes to the comparison of overall texture and mouth feel.

Figure 3:
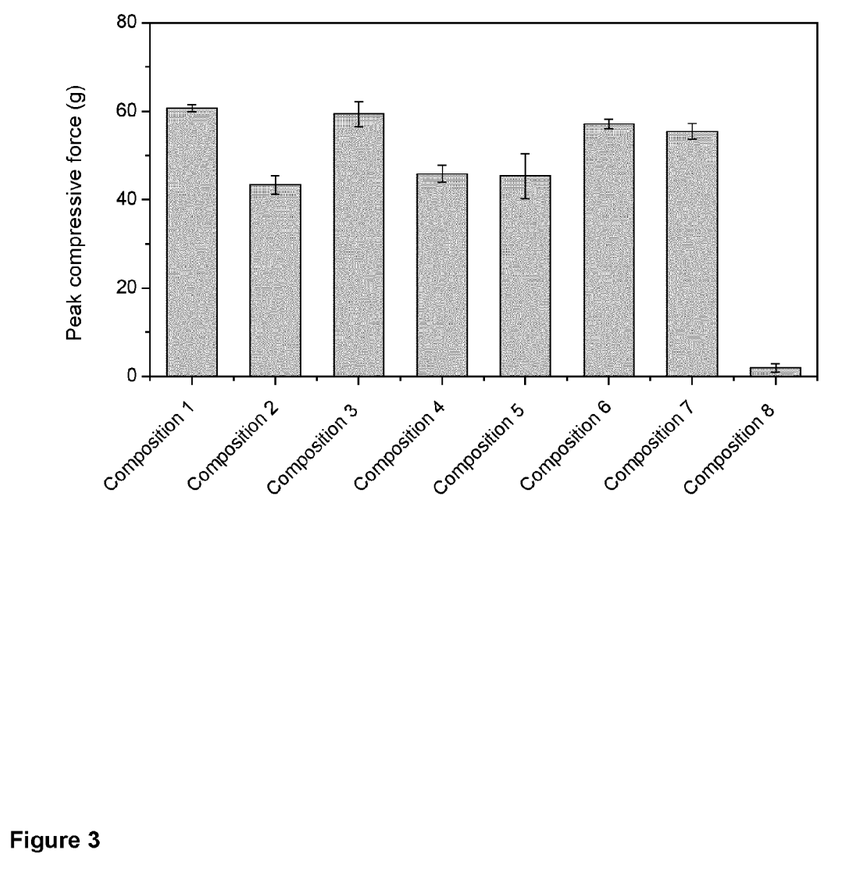
FIG. 3 shows a graphical representation of the peak compressive forces of filling compositions according to the invention and comparative reference filling compositions.

The relative hardness of different filling samples was determined by measuring peak compressive force of filling at room temperature (20° C.) by a stainless steel ball probe of 2 mm diameter using a TA-XT2 Texture Analyzer™ at 1 mm/sec test speed). FIG. 3 shows that a filling made with liquid oil alone (composition 8) is very soft in texture. The results reveal that similar hardness can be obtained when replacing solid fat by oil powder (composition 3, 6 and 7). For the detailed composition of the different fillings samples it is referred to Table 2.

Example 8

Temperature Sensitivity of Sample Confectionery Fillings

Figure 4:
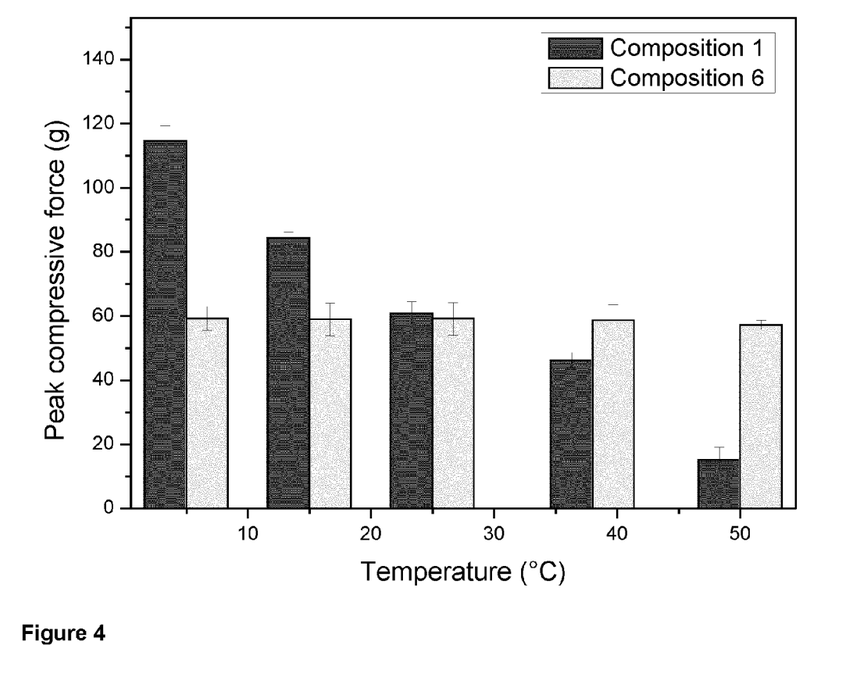
FIG. 4 shows a graphical representation of the temperature dependence of filling composition according to the invention and comparative reference filling composition.

Another important technological feature of a filling composition according to the invention is its resistance to change in textural properties upon heating or cooling. The relative hardness of filling sample containing encapsulated oil (light bars, composition 6) and reference filling (dark bars, composition 1) as a function of temperature was determined by measuring peak compressive force of filling by a stainless steel ball probe of 2 mm diameter using a TA-XT2 Texture Analyzer™ at 1 mm/sec test speed). FIG. 4 shows that due to the heat stability of the encapsulated oil, the filling composition containing encapsulated oil is resistant to textural changes across temperature as compared to a reference filling; the later becomes softer at higher temperature due to typical melting of saturated fat. For the detailed composition of the fillings samples it is referred to Table 2.

Example 9

Confocal Micrograph of Sample Confectionery Filling

To observe the encapsulated oil in the confectionery filling, microscopy work was performed using a confocal microscope (Zeiss—Axioplan2—LSM510) where the hydrophilic phase like the protein was stained red by using rhodamine dye and imaged using×100 magnification at an excitation of 543 nm.

Figure 5:
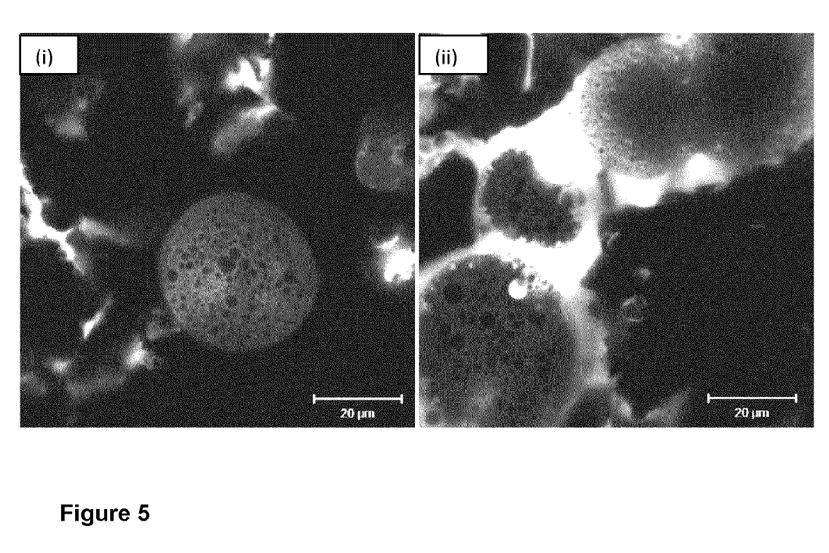
FIG. 5 shows confocal micrographs of filling compositions showing encapsulated oil.

FIG. 5 clearly depicts the presence of intact encapsulated oil in the filling samples prepared by the standard mixing process.

In FIG. 5: (i)=composition 2, (ii)=composition 3 (For the detailed composition of the different fillings samples it is referred to Table 2.)

The invention claimed is:

1. A filling composition consisting of:
   from 5 to 60% w/w of an oil powder, the oil powder comprising at least 60% w/w of a liquid oil in an inner core, encapsulated in an outer shell of a matrix material comprising protein;
   from 1 to 20% w/w of a free liquid oil;
   a solid fat, wherein a combination of the oil powder and the free liquid oil is 15-75% of a total of the oil powder, the free liquid oil, and the solid fat;
   from 10 to 70% w/w of sugar;
   from 5 to 70% w/w of cocoa powder; and
   at least one supplementary ingredient selected from the group consisting of skimmed milk powder, full cream milk powder, whey powder, fruit acids, natural flavors, synthetic flavors, natural colors, artificial colors, and emulsifiers.

2. A filling composition according to claim 1 wherein the oil powder comprises at least 80% oil.

3. A filling composition according to claim 1 wherein the oil powder comprises at least 90% oil.

4. A filling composition according to claim 1 wherein the liquid oil in the oil powder and/or the free liquid oil are independently selected from the group consisting of olive oil, safflower oil, sunflower oil, fish oil, soy bean oil, soy oil, palm kernel oil, palm oil, coconut oil, flaxseed oil, rapeseed oil, primrose oil, linseed oil, corn oil, grape seed oil, nut oil, rice bran oil, sesame oil, peanut oil, cottonseed oil, and combinations thereof.

5. A filling composition according to claim 1 wherein the outer shell comprises cross-linked protein and a carbohydrate.

6. A filling composition according to claim 1 wherein the protein comprises at least one food-grade protein.

7. A filling composition according to claim 1, wherein the outer shell of the encapsulated oil powder has an average particle size of about 0.1-100 μm.

8. The filling composition according to claim 1, wherein the combination of the oil powder and the free liquid oil is 25-60% of the total of the oil powder, the free liquid oil, and the solid fat.

9. A method for the preparation of a filling composition, the method comprising:
   encapsulating an oil powder with an outer shell of a matrix material comprising protein to make an oil powder comprising at least 60% w/w of a liquid oil in an inner core, encapsulated in the outer shell of the matrix material comprising protein; and
   mixing the encapsulated oil powder with remaining ingredients of the filling composition, the remaining ingredients consisting of a free liquid oil, solid fat, sugar, cocoa powder, and at least one supplementary ingredient selected from the group consisting of skimmed milk powder, full cream milk powder, whey powder, fruit acids, natural flavors, synthetic flavors, natural colors, artificial colors, and emulsifiers, wherein a combination of the oil powder and the free liquid oil is 15-75% of a total of the oil powder, the free liquid oil, and the solid fat.

10. The method according to claim 9, wherein the filling composition is part of a composite product.

11. The method according to claim 10 wherein the composite product is a bakery or confectionery product.

12. The method according to claim 9, wherein the combination of the oil powder and the free liquid oil is 25-60% of the total of the oil powder, the free liquid oil, and the solid fat.

13. A process for the preparation of a filling composition, the process comprising:
   mixing (1) from 5 to 60% w/w of an oil powder comprising at least 60% w/w of a liquid oil in an inner core encapsulated in an outer shell of a matrix material comprising protein, (2) from 1 to 20% w/w of a free liquid oil, and (3) a solid fat with (4) remaining ingredients of the filling composition consisting of sugar, cocoa powder, and at least one supplementary ingredient selected from the group consisting of skimmed milk powder, full cream milk powder, whey powder, fruit acids, natural flavors, synthetic flavors, natural colors, artificial colors, and emulsifiers, wherein a combination of the oil powder and the free liquid oil is 15-75% of a total of the oil powder, the free liquid oil, and the solid fat.

14. A composite product comprising:
   a filling composition consisting of from 5 to 60% w/w of an oil powder, from 1 to 20% w/w of a free liquid oil, a solid fat, from 10 to 70% w/w of sugar, from 5 to 70% w/w of cocoa powder, and at least one supplementary ingredient selected from the group consisting of skimmed milk powder, full cream milk powder, whey powder, fruit acids, natural flavors, synthetic flavors, natural colors, artificial colors, and emulsifiers, the oil powder comprising at least 60% w/w of a liquid oil in an inner core, encapsulated in an outer shell of a matrix material comprising protein, wherein a combination of the oil powder and the free liquid oil is 15-75% of a total of the oil powder, the free liquid oil, and the solid fat.

* * * * *